Patented June 24, 1930

1,767,676

UNITED STATES PATENT OFFICE

GERALD J. HOWITZ, OF NEW YORK, N. Y., ASSIGNOR OF ONE-HALF TO LE ROY SEIDELL, OF PLAINFIELD, NEW JERSEY

PROCESS AND COMPOSITION FOR THE GENERATION OF CHLORINE

No Drawing.      Application filed August 11, 1924. Serial No. 731,491.

The invention relates to processes and compositions which are particularly adapted for the generation of chlorine.

An object of the invention is to provide a composition of matter which will generate chlorine for a substantial period of time.

Another object of the invention is to provide an improved process for the generation of chlorine.

Another object of the invention is to provide a process and composition of matter for the generation of chlorine by means of which chlorine may be administered in the treatment of disease as well as utilized for industrial purposes.

Another object of the invention is to provide a composition of matter which in a dry condition will generate chlorine.

Another object of the invention is to provide a composition of matter which is efficient in action and economical in preparation.

Another object of the invention is to provide a composition of matter for the generation of chlorine which may be readily packaged and availed of for home use.

Other objects of the invention will in part be obvious and will in part appear hereinafter.

The invention accordingly comprises a process, and a composition of matter possessing the characteristics, properties and the relation of constituents, which will be exemplified in the detailed disclosure hereinafter set forth and the scope of the application of which will be indicated in the claims.

In the practice of the invention, a composition of matter may be prepared which will generate chlorine in the dry state, in a steady and continuous flow, for a substantial period of time. The composition of matter adapted for use in a dry state may comprise an oxidizing agent, a chloride, a weak acid medium in solid state as boric acid and an organic acid of vegetable origin, and/or an acid salt.

These ingredients may be admixed in suitable proportions in the dry state, and when desired for immediate use a number of the desired types of ingredients may be admixed together. When it is desired to prepare the composition of matter for subsequent use, it is preferable to place the oxidizing agent and the chloride, and the weak acid medium and/or acid salt, in separate packages—these ingredients to be put together just prior to use. Although the full complement of ingredients may be admixed, a loss in effect will thereby ensue. For the sake of convenience of terminology the expression "weakly acidic agent" is employed hereinafter to designate generally those materials embraced by the terms "weak acid medium" and "acid salt."

Among the ingredients that may be employed, mention may be made, for example, as oxidizing agents, of chlorates of sodium and potassium, permanganates of potassium, sodium and calcium, dichromates of potassium and sodium, bromates of sodium and potassium, chromates of sodium and potassium; persalts, such as persulfates, perborates and percarbonates, manganese dioxide, chromic oxide, lead dioxide, and barium dioxide; as a chloride, of the chlorides of sodium, potassium, ammonium, calcium, barium, strontium, magnesium, zinc, iron and stannous chloride, as organic acids of vegetable origin, of citric, tartaric and malic; as acid salts of the primary phosphates, acid tartrates and bisulfates of sodium, potassium and calcium.

As illustrative embodiments of a manner in which the invention may be carried into practice, the following examples are given:

*Example I*

For immediate use, take 12 parts potassium chlorate and admix therewith 4 parts sodium chloride, 4 parts of citric acid, and 1 part sodium acid sulfate. The constituents prior to admixing should be in a dry state and in a finely subdivided condition. If it is desired to prepare the composition for subsequent use, the potassium chlorate and sodium chloride, and the citric acid and sodium acid sulfate, are preferably admixed separately. The full admixture is under these conditions prepared by the user just prior to use. In the place of the potassium chlorate and other salts there may be used those which have hereinbefore been mentioned, the quantities substituted being molecular equivalents.

Example II

Take 12 grams potassium chlorate, 4 grams zinc chloride and 4 grams boric acid and admix in a dry and finely subdivided condition.

Example III

Take 12 grams potassium chlorate, 4 grams sodium chloride and 4 grams sodium bisulfate and admix in a dry and finely subdivided condition.

Example IV

Take 12 parts potassium chlorate, 4 parts sodium chloride and 5 parts citric acid, these constituents being dry and in a finely subdivided condition, and admix.

When employing the composition of matter for the generation of chlorine, the quantity of chlorine evolved may be varied by varying the proportions of the ingredients. This variation may be utilized either for industrial purposes or in the treatment of disease and when so used may be such as to evolve a large quantity of chlorine, when it is desired to fill a room, or a small amount of chlorine, when it is desired to use the composition in the manner of an inhaler.

The efficacy of chlorine in the treatment of disease, especially in the treatment of colds, bronchial and nasal infections, has been and is being well demonstrated. The composition of matter described herein presents a means for rendering it readily available for such purpose. The composition of matter, in that it is in the form of a dry powder, may be prepared without difficulty, with economy, and is available to the user in a form which makes application simple. Further, the composition of matter may be placed for trade in packages, such as boxes or bottles of convenient size, preferably maintaining the acid medium and acid salts separate from the oxidizing agent and the chloride, to thereby retain the efficiency or chlorine-generating capability at a maximum. When so separately packaged the user is only required to admix the contents of the two packages to avail himself of chlorine in a suitable concentration for use.

It will be understood that the invention in its broad aspects comprises the conjoint use of an oxidizing agent, a chloride, and a weak acid medium which may be an organic acid of vegetable origin, either with or without an acid salt, in a composition of matter for the purpose of generating chlorine. The chlorine so produced may be employed in the treatment of disease and as a disinfectant and deodorizer, and in bleaching among others.

Since certain changes may be made in the above composition of matter and different embodiments of the invention could be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. The process of generating chlorine, which consists in the treatment of an oxidizing agent and a chloride in a dry state with a weakly acidic agent in a dry state.

2. The process of generating chlorine, which consists in the treatment of an oxidizing agent and a chloride in a dry state with an acid salt in a dry state.

3. The process of generating chlorine, which comprises the treatment of an oxidizing agent and a chloride with an organic acid of vegetable origin.

4. The process of generating chlorine, which comprises the treatment of an oxidizing agent and an alkali metal chloride with a tribasic organic acid of vegetable origin.

5. The process of generating chlorine, which comprises the treatment of an oxidizing agent and a chloride with an organic acid of vegetable origin and an acid salt.

6. The process of generating chlorine, which comprises the treatment of an oxidizing agent and sodium chloride with citric acid and sodium bisulphate.

7. A composition of matter adapted for use in the generation of chlorine, including in dry admixture, an oxidizing agent, a chloride, and a weak acid medium.

8. A composition of matter adapted for use in the generation of chlorine, including an oxidizing agent, an alkali metal chloride, and an organic acid of vegetable origin.

9. A composition of matter adapted for use in the generation of chlorine, including an oxidizing agent, a chloride, an organic acid of vegetable origin, and an acid salt.

10. A composition of matter adapted for use in the generation of chlorine, including an alkali metal chlorate, an alkali metal chloride, an alkali metal bisulphate, and a tribasic organic acid of vegetable origin.

11. A composition of matter adapted for use in the generation of chlorine, including potassium chlorate, sodium chloride, citric acid and sodium bisulphate.

12. A composition of matter adapted for use in the generation of chlorine, including potassium chlorate, sodium chloride, citric acid and sodium bisulphate in the approximate proportions 12:4:4:1 respectively.

In testimony whereof I affix my signature.

GERALD J. HOWITZ.